United States Patent Office 3,062,894
Patented Nov. 6, 1962

3,062,894
POLY(PERFLUOROALKYLTHIO)
ORGANIC COMPOUNDS
John F. Harris, Jr., Wilmington, Del., assignor to E. I.
du Pont de Nemours and Company, Wilmington, Del.,
a corporation of Delaware
No Drawing. Filed June 14, 1961, Ser. No. 116,960
9 Claims. (Cl. 260—609)

This invention relates to a new class of fluorinated organic sulfides and to methods for preparing them.

The new products of this invention are poly(perfluoroalkylthio) organic compounds containing at least two perfluoroalkylthio groups attached to the same carbon atom. They can be represented by the formula

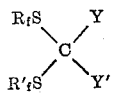

where Y and Y' can be the same or different and are hydrogen, halogen, alkyl, haloalkyl, $R_fS$, or $R_fS$-lower alkyl, (i.e., mono-$R_fS$ substituted lower alkyl) and where $R_f$ and $R'_f$ can be the same or different and are perfluoroalkyl. Because of ease of preparation, a preferred class is that in which Y and Y' are the same or different and are hydrogen, alkyl, haloalkyl, or $R_fS$; $R_f$ and $R'_f$ are as above; and the alkyl, haloalkyl, $R_f$, and $R'_f$ groups each contain up to and including ten carbons. Lower alkyl groups (including haloalkyl and perfluoroalkyl) are a particularly preferred group. The α-monohalo-radicals are a preferred group of the halohydrocarbyl radicals.

These poducts can be prepared by the following methods:

*Process I.*—A perfluoroalkylthiometal compound is reacted with a polyhalohydrocarbon at a temperature of from 25° C. to 200° C. Higher temperatures can be used but confer no advantage.

The perfluoroalkylthiometal compounds that can be used can be represented by the formulas $R_fS$—Hg—X, $(R_fS)_2Hg$, $R_fSAg$, and $R_fSCu$, where X is halogen and $R_f$ is perfluoroalkyl. Because of ready availability, the preferred type is a group of mercury compounds $(R_fS)_2Hg$, wherein $R_f$ contains up to and including ten carbons. The polyhalohydrocarbon can be represented by the formula

where X is halogen, and X' and X" are the same or different and are hydrogen, halogen, alkyl, or haloalkyl. A class preferred because of its relatively greater reactivity is that in which X is chlorine, bromine, or iodine, and X' and X" are the same or different and are chlorine, bromine, iodine (halogen of atomic number greater than 16), an alkyl group of up to and including ten carbons, or a haloalkyl group of up to and including ten carbons. A particularly preferred group are the lower alkyl groups as previously defined.

*Process II.*—A perfluoroalkanesulfenyl halide is reacted with an ethylenically unsaturated hydrocarbyl perfluoroalkyl sulfide in the presence of an agent that effects the formation of free radicals. The various free radical processes are well known and conditions will depend on the type of agent used. Temperatures will usually vary in the range —50° to 200° C. Higher temperatures can be used but offer no advantage. The preferred method of forming free radicals is the use of ultraviolet irradiation, but an azo or peroxy catalyst can also be used. The term free radical catalyst is intended to include any method of formation of free radicals; physical, such as ultraviolet light; and chemical, such as peroxides.

The perfluoroalkanesulfenyl halide can be represented by the formula $R_f$—S—X, where $R_f$ is perfluoroalkyl and X is halogen. Because of easier availability and higher reactivity, compounds in which $R_f$ contains up to and including ten carbons and X is chlorine or bromine are preferred. The ethylenically unsaturated hydrocarbyl perfluoroalkyl sulfide can be represented by the formula

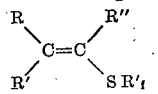

where R, R', and R" can be the same or different and are hydrogen or alkyl, and $R'_f$ is perfluoroalkyl. Because of ease of availability, preferred compounds are those in which R and R' are the same or different and are hydrogen or alkyl groups containing a combined total of up to and including nine carbons, R" is hydrogen or an alkyl group of up to and including ten carbons, and $R'_f$ contains up to and including ten carbons.

The reactants are usually used in approximately the molar ratios dictated by the stoichiometry of the reaction involved. An excess of either reactant can be used but provides no advantage other than to insure essentially complete consumption of the other reactant.

Within a rather wide range, temperature is not a critical factor in either of the processes of this invention. In Process I, the preferred range is from 75° C. to 150° C. Process II is advantageously carried out at ordinary temperatures (20–30° C.) when UV light is used as the free radical agent.

Both processes are conveniently carried out at atmospheric pressure. Higher pressures can be used but offer no advantage except when low-boiling reactants or products are involved. In such a case it is convenient to operate in a closed system at autogenous pressure.

Usually both processes are carried out without a solvent. A solvent inert to the reactants and products can be used, however.

The time required in Process I varies considerably. Under the preferred conditions it can be as short as a few minutes or as long as 24 hours. The course of the reaction can be followed by the precipitation of metal halide. When no more precipitate appears, the reaction is complete. Process II usually requires from 0.5 to two hours under the preferred conditions, athough in some cases the time is advantageously extended to as long as several days. The products are separated from the reaction mixtures by distillation. For further purification, precision distillation or preparative-scale gas chromatography can be used.

The poly(perfluoroalkylthio) organic compounds of this invention are, for the most part, liquids at ordinary temperatures, and they can be distilled without decomposition at ordinary or moderately reduced pressures. They are soluble in the usual organic solvents, e.g., ethyl alcohol, acetone, benzene, and chloroform, and insoluble in water. They are useful as solvents for polymers, especially highly fluorinated polymers.

Process I can be carried out in a conventional reactor having a glass, ceramic, or metal inner surface. For Process II, a reactor made of a material that transmits ultraviolet radiation must be used unless the light source is inside the flask; quartz or glass can be used, quartz being preferred.

Starting materials used in the process of this invention are prepared as follows:

Bis(trifluoromethylthio)mercury, $(CF_3S)_2Hg$, is prepared by the method of Man, Coffman, and Muetterties, J. Am. Chem. Soc., 81, 3575 (1959).

Trifluoromethanesulfenyl chloride, $CF_3SCl$, is prepared by the method of Haszeldine and Kidd, J. Chem. Soc., 1953, 3219.

Trifluoromethyl vinyl sulfide is prepared by addition of trifluoromethanethiol to vinyl chloride in the presence of ultraviolet radiation, followed by dehydrochlorination with alcoholic potassium hydroxide. This preparation is described in the application of John F. Harris, Serial No. 58,910, September 28, 1960.

5-trifluoromethyldodecafluorohexyl vinyl sulfide is prepared by reacting 5-trifluoromethyldodecafluorohexanesulfenyl chloride with ethylene in acetonitrile and dehydrochlorinating the product with alcoholic potassium hydroxide. This preparation and that of the starting sulfenyl chloride are described in the application of John F. Harris, Serial No. 58,910.

The following examples, in which all parts are by weight and pressures are atmospheric, illustrate the processes and products of this invention.

EXAMPLE 1

*Bis(Trifluoromethylthio)Methane*

$$(CF_3S)_2Hg + CH_2I_2 \rightarrow (CF_3S)_2CH_2 + HgI_2$$

Bis(trifluoromethylthiol)mercury (50 parts) was placed in a glass reactor fitted with a dropping funnel and a stirrer and vented through a trap cooled with an acetone-solid carbon dioxide mixture. The reactor was placed in an oil bath, the bath was heated to 100° C., and 20 parts of methylene iodide was added dropwise during 1½ hours with stirring. Heating and stirring at 100° C. were continued for approximately 18 hours. Evacuation of the system with a water pump through the cooled trap caused the distillation of the product from the reaction vessel into the trap. Upon distillation of the trap contents through a spinning-band still, there was obtained 6.3 parts (39% yield) of bis(trifluoromethylthio)methane distilling at 74–78° C. (mostly 78° C.); $n_D^{25}$, 1.3562.

*Analysis.*—Calcd. for $C_3H_2F_6S_2$: F, 52.7; S, 29.6. Found: F, 52.4; S, 29.3.

Bis(trifluoromethylthio)methane can be halogenated directly to give halogen-substituted derivatives. For example, reaction with bromine gives both bromo- and dibromobis(trifluoromethylthio)methane.

EXAMPLE 2

*Tris(Trifluoromethylthio)Methane*

$$3(CF_3S)_2Hg + 2CHI_3 \rightarrow 2(CF_3S)_3CH + 3HgI_2$$

Fifty parts of bis(trifluoromethylthio)mercury and 20 parts of iodoform were placed in the reactor described in Example 1. The oil bath was heated to 118° C. during one hour and maintained at this temperature for another four hours. The product was isolated as in Example 1. Upon distillation through a spinning-band still, there was obtained 13.3 parts (83% yield) of tris(trifluoromethylthio)methane distilling at 102–106° C. (mostly 106° C.); $n_D^{25}$, 1.3650.

*Analysis.*—Calcd. for $C_4HF_9S_3$: F, 54.1; S, 30.4. Found: F, 54.0; S, 29.3.

EXAMPLE 3

*1,1-Bis(Trifluoromethylthio)Ethane*

$$(CF_3S)_2Hg + Br_2CHCH_3 \rightarrow (CF_3S)_2CHCH_3 + HgBr_2$$

A mixture of 63 parts of bis(trifluoromethylthio)mercury and 18.9 parts of 1,1-dibromomethane was placed in the reactor described in Example 1. (In this experiment the reactor was fitted with a reflux condenser which was vented through an acetone-solid-carbondioxide-cooled trap.) The oil bath was heated until the mixture refluxed vigorously (bath temperature 129° C.) and kept at this temperature for 20 hours. The product was then isolated as described in Example 1. Upon distillation of the trap contents through a spinning-band still, there was obtained 8.6 parts (37% yield) of 1,1-bis(trifluoromethylthio)ethane distilling at 86–89° C.; $n_D^{25}$, 1.3642.

*Analysis.*—Calcd. for $C_4H_4F_6S_2$: F, 49.5; S, 27.8. Found: F, 47.4; S, 28.4.

EXAMPLE 4

*Tetrakis(Trifluoromethylthio)Methane*

$$2(CF_3S)_2Hg + CBr_2Cl_2 \rightarrow (CF_3S)_4C + HgBr_2 + HgCl_2$$

A mixture of 100 parts of bis(trifluoromethylthio)mercury and 15 parts of dibromodichloromethane was heated slowly to 100° C. in the reactor described in Example 1, and then maintained at this temperature for one hour. The crude product was removed from the reaction mixture by evacuating through the cold trap. The trap contents were dissolved in trichlorofluoromethane, and anhydrous hydrogen chloride was passed in until there was no further precipitation. By this step, excess $(CF_3S)_2Hg$ present in the mixture was converted to solid $HgCl_2$ (the precipitate) and volatile $CF_3SH$. The mixture was filtered, and the filtrate was distilled through a spinning-band still. There was thus obtained 15.3 parts (60%) of tetrakis(trifluoromethylthio)methane distilling at 82° C./70 mm.; $n_D^{25}$, 1.3977. Analysis was performed on a sample prepared in another experiment and having the same physical properties as the present product.

*Analysis.*—Calcd. for $C_5F_{12}S_4$: F, 54.8; S, 30.8. Found: F, 54.0; S, 31.3.

EXAMPLE 5

*1,1-Bis(Trifluoromethylthio)-2-Chloroethane*

$$CF_3SCl + CF_3SCH=CH_2 \xrightarrow{h\nu} (CF_3S)_2CHCH_2Cl + (CF_3S)_2CHCH_2SCF_3$$

A mixture of 10 parts of trifluoromethanesulfenyl chloride and 11 parts of trifluoromethyl vinyl sulfide contained in a quartz vessel fitted with an acetone-solid-carbon-dioxide-filled condenser was irradiated with a quartz, spiral-shaped, low-pressure mercury resonance lamp for 45 minutes. Upon distillation of the reaction mixture, there was obtained 12.5 parts of a fraction distilling at 122–134° C.; $n_D^{25}$, 1.3950–1.3998. A gas chromatogram of the product from a similar run showed the presence of three major components. Two of these major components were isolated by preparative-scale gas chromatography. One was identified as 1,1-bis(trifluoromethylthio)-2-chloroethane, $(CF_3S)_2CHCH_2Cl$, B.P. 128° C.; $n_D^{25}$, 1.3955.

*Analysis.*—Calcd. for $C_4H_3ClF_6S_2$: Cl, 13.4; F, 43.0; S, 24.2. Found: Cl, 13.5; F, 42.9; S, 24.5.

The other was 1,1,2-tris(trifluoromethylthio)ethane, $(CF_3S)_2CHCH_2SCF_3$, B.P. 137.5° C.; $n_D^{25}$, 1.3803.

*Analysis.*—Calcd. for $C_5H_3F_9S_3$: F, 51.8; S, 29.1. Found: F, 50.8; S, 29.3.

EXAMPLE 6

*1,1,2-Tris(Trifluoromethylthio)Ethane*

$$3(CF_3S)_2Hg + 2Br_2CHCH_2Br \rightarrow 2(CF_3S)_2CHCH_2SCF_3$$

A mixture of 20 parts of 1,1,2-tribromoethane and 65 parts of bis(trifluoromethylthio)mercury was placed in the reactor described in Example 1, and the oil bath was heated at 130° C. for 20 hours. The product was isolated as described in Example 1. Upon distillation of the trap contents through a spinning-band still, there was obtained 2.4 parts (10% yield) of 1,1,2-tri(trifluoromethylthio)ethane distilling at 63–67° C./60 mm.; $n_D^{25}$, 1.3830.

*Analysis.*—Calcd. for $C_5H_3F_9S_3$: C, 18.2; H, 0.9; S, 29.1. Found: C, 18.4; H, 1.3; S, 28.4.

EXAMPLE 7

2-Chloro-1-Trifluoromethylthio-1-(5-Trifluoromethyldodecafluorohexylthio)Ethane

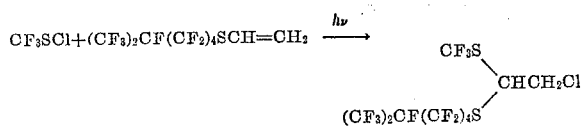

A mixture of 16.4 parts of 5-trifluoromethyldodecafluorohexyl vinyl sulfide and 8 parts of trifluoromethanesulfenyl chloride was irradiated as described in Example 5 for a period of 1½ hours. Upon distillation of the reaction mixture through a spinning-band still there was obtained 14.7 parts (69%) of 2-chloro-1-trifluoromethylthio - 1 - (5-trifluoromethyldodecafluorohexylthio)ethane distilling at 84–90° C./6 mm.; $n_D^{25}$, 1.3611.

*Analysis.*—Calcd. for $C_{10}H_3ClF_{18}S_2$: F, 60.5; S, 11.4. Found: F, 60.6; S, 11.0.

This invention has been illustrated by the foregoing specific Examples 1–7. However, it is generic to the compounds broadly defined by the formula in column 1. Additional specific examples of these compounds are shown in Table I. In each example, the perfluorothiometal compound in the first column is reacted with the polyhalohydrocarbon in the second column by the method of Process I (column 1) to give the product shown in the third column. The perfluorothiomercury compounds can be prepared by the methods of Haszeldine et al., J. Chem. Soc. 1952, 2198; 1953, 3219; 1955, 3871. $CF_3SAg$, $CF_3SCu$, and higher perfluoroalkylthio derivatives of these metals can be prepared by the method of Man, Coffman, and Muetterties, J. Am. Chem. Soc. 81, 3575 (1959). The polyhalohydrocarbons can all be prepared by known methods.

Products containing chlorine or bromine bonded to a saturated aliphatic carbon can be converted to the corresponding iodides by reaction with a metal iodide; products containing chlorine similarly bonded can be converted to bromides by reaction with a metal bromide. For example, reaction with potassium iodide in acetone converts 1-chloro-7,7-bis-(perfluoro-n-butylthio)octane to the 1-iodo compound:

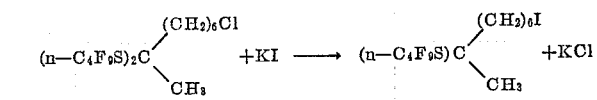

Still more examples of the products of this invention are listed in Table II. In each of these examples, the perfluoroalkanesulfenyl halide in the first column is reacted with the ethylenically unsaturated hydrocarbyl perfluoroalkyl sulfide in the second column by the method of Process II (column 1) to give the product shown in the third column. Perfluoroalkanesulfenyl halides can be made by the method of Haszeldine and Kidd, J. Chem. Soc., 1953, 3219. All the ethylenically unsaturated hydrocarbyl perfluoroalkyl sulfides except the first one are made by the reaction of a perfluoroalkanesulfenyl chloride or bromide with an ethylenically unsaturated hydrocarbon in a polar solvent such as acetonitrile, followed by dehydrohalogenation with alcoholic potassium hydroxide (Harris U.S. Ser. No. 58,910). For example, the second compound in the second column is made in this manner from trifluoromethanesulfenyl chloride and propylene. When the ethylenically unsaturated hydrocarbon is unsymmetrical, the way in which the perfluoroalkanesulfenyl halide adds to it can be reversed, to give a different final product, by conducting the reaction in the absence of a polar solvent and in the presence of an agent that effects the formation of free radicals, e.g., ultraviolet light, an azo compound, or a peroxy compound. For example, the first compound in the second column can be made by reacting trifluoromethanesulfenyl chloride with propylene in the presence of ultraviolet light, followed by dehydrochlorination with alcoholic potassium hydroxide.

TABLE I

| | | |
|---|---|---|
| $CF_3SAg$ | $Cl_2C\begin{matrix}\diagup n{-}C_{12}H_{25}\\ \diagdown CH_2F\end{matrix}$ | $(CF_3S)_2C\begin{matrix}\diagup n{-}C_{12}H_{25}\\ \diagdown CH_2F\end{matrix}$ |
| $(C_2F_5S)_2Hg$ | $Cl_2C\begin{matrix}\diagup CH_2{-}CH_2\\ \phantom{xx}CH\phantom{xxxx}CH_2\\ \diagdown CH_2{-}CH_2\\ \diagdown n{-}C_7H_{15}\end{matrix}$ | $(C_2F_5S)_2C\begin{matrix}\diagup CH_2{-}CH_2\\ \phantom{xx}CH\phantom{xxxx}CH_2\\ \diagdown CH_2{-}CH_2\\ \diagdown n{-}C_7H_{15}\end{matrix}$ |
| $[(CF_3)_2CFS]_2Hg$ | $Cl_2C\begin{matrix}\diagup\phantom{x}\bigcirc\phantom{x}\\ \diagdown C_2H_5\end{matrix}$ | $[(CF_3)_2CFS]_2C\begin{matrix}\diagup\phantom{x}\bigcirc\phantom{x}\\ \diagdown C_2H_5\end{matrix}$ |
| $CF_3SHgCl$ | $Cl_3C{-}\bigcirc{-}C(CH_3)_3$ | $(CF_3S)_3C{-}\bigcirc{-}C(CH_3)_3$ |
| $(n{-}C_4F_9S)_2Hg$ | $Br_2C\begin{matrix}\diagup (CH_2)_6Cl\\ \diagdown CH_3\end{matrix}$ | $(n{-}C_4F_9S)_2C\begin{matrix}\diagup (CH_2)_6Cl\\ \diagdown CH_3\end{matrix}$ |

TABLE II

As shown in the following example, the products of this invention are useful as solvents for difficultly soluble polymers. Solutions of low-molecular-weight tetrafluoroethylene polymer were prepared by dissolving 0.05 g. of the polymer in 0.5 ml. of each of the following compounds at about 60° C.:

$(CF_3S)_4C$  $(CF_3S)_2CH_2$  $(CF_3)_2CF(CF_2)_4S$  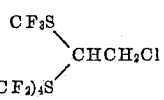

Strips of filter paper were partially immersed in these solutions and allowed to air-dry. The strips were then put in water. The areas that had been immersed in the polymer solutions were not wet by the water, which showed they had been waterproofed by the treatment.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compounds of the formula

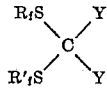

wherein $R_f$ and $R'_f$ are perfluoroalkyl of up to and including 10 carbons and Y and Y' are selected from the group consisting of hydrogen, halogen, alkyl of up to and including 10 carbons, haloalkyl of up to and including 10 carbons, $R_fS$, and $R_fS$-lower alkyl.

2. Compounds of the formula

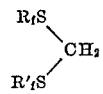

wherein $R_f$ and $R'_f$ are perfluoroalkyl of up to and including 10 carbons.

3. Compounds of the formula

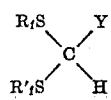

wherein $R_f$ and $R'_f$ are perfluoroalkyl of up to and including ten carbons and Y is an α-monohaloalkyl of up to and including 10 carbons.

4. $(CF_3S)_2CH_2$.
5. $(CF_3S)_4C$.
6. $(CF_3S)_2CHCH_2Cl$.

7. Process for the formation of poly(perfluoroalkylthio)organic compounds having at least two perfluoroalkylthio groups on the same carbon, which comprises reacting a perfluoroalkylthiometal compound selected from the group consisting of $R_fSHgX$, $(R_fS)_2Hg$, $R_fSAg$ and $R_fSCu$, where $R_f$ is perfluoroalkyl of up to and including 10 carbons; and X is halogen, with a compound of the formula

where X is as defined above, and X' and X'' are selected from the group consisting of hydrogen, halogen, alkyl of up to and including 10 carbons and haloalkyl of up to and including 10 carbons, at a temperature in the range of 25° to 200° C., and isolating the resulting product.

8. Process for the formation of poly(perfluoroalkylthio)organic compounds having at least two perfluoroalkylthio groups on the same carbon, which comprises reacting $R_fSX$, wherein $R_f$ is a perfluoroalkyl of up to and including 10 carbons and X is halogen, with a compound of the formula

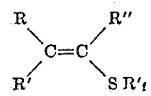

wherein R and R' are selected from the class consisting of hydrogen and alkyl groups containing a combined total of up to and including nine carbon atoms, R'' is selected from the group consisting of hydrogen and alkyl of up to and including ten carbon atoms and $R'_f$ is perfluoroalkyl of up to and including ten carbons, in the presence of a free-radical catalyst, and isolating the resulting product.

9. Process according to claim 8 wherein the free-radical catalyst is ultra-violet light.

No references cited.